US012596018B2

(12) United States Patent
Irle

(10) Patent No.: US 12,596,018 B2
(45) Date of Patent: Apr. 7, 2026

(54) POSITION DETECTION FOR A ROTATION ANGLE SENSOR

(71) Applicant: HELLA GmbH & Co. KGaA, Lippstadt (DE)

(72) Inventor: Henning Irle, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 167 days.

(21) Appl. No.: 18/370,274

(22) Filed: Sep. 19, 2023

(65) Prior Publication Data

US 2024/0003713 A1 Jan. 4, 2024

Related U.S. Application Data

(63) Continuation of application No. PCT/EP2022/055280, filed on Mar. 2, 2022.

(30) Foreign Application Priority Data

Mar. 19, 2021 (DE) ...................... 10 2021 106 870.3

(51) Int. Cl.
*G01D 5/24* (2006.01)
*G01B 7/30* (2006.01)
(Continued)

(52) U.S. Cl.
CPC .................. *G01D 5/24* (2013.01); *G01B 7/30* (2013.01); *G01D 5/204* (2013.01); *B62D 15/0215* (2013.01)

(58) Field of Classification Search
CPC .. G01R 33/09; G01R 33/091; G01R 33/0011; G01R 33/07; G01R 33/06; G01L 3/10;
(Continued)

(56) References Cited

U.S. PATENT DOCUMENTS

| | | | | |
|---|---|---|---|---|
| 5,869,962 A | * | 2/1999 | Kasumi | ................... G01P 3/488 |
| | | | | 324/207.2 |
| 6,404,188 B1 | * | 6/2002 | Ricks | ................... G01D 5/2457 |
| | | | | 324/207.25 |

(Continued)

FOREIGN PATENT DOCUMENTS

| | | |
|---|---|---|
| DE | 102004019379 A1 | 11/2005 |
| EP | 1269133 B1 | 5/2004 |

(Continued)

OTHER PUBLICATIONS

International Search Report dated Jun. 13, 2022 in corresponding application PCT/EP2022/055280.

*Primary Examiner* — Son T Le

(74) *Attorney, Agent, or Firm* — Muncy, Geissler, Olds & Lowe, P.C.

(57) ABSTRACT

A capacitive rotation angle sensor and an associated system with a capacitive rotation angle sensor. The capacitive rotation angle sensor has at least one stator, at least one rotor, and an evaluation unit. The at least one rotor has a main body and multiple rotor vanes extending radially outward from the main body. Multiple first rotor vanes of the multiple rotor vanes are designed differently from multiple second rotor vanes of the multiple rotor vanes. The evaluation unit is designed to detect when the multiple first rotor vanes reach, have reached, or exceed a predetermined rotation angle.

13 Claims, 6 Drawing Sheets

(51) Int. Cl.
  *G01D 5/20*     (2006.01)
  *B62D 15/02*    (2006.01)
(58) Field of Classification Search
  CPC ......... G01L 5/00; G01L 5/0023; G01L 3/104;
          G01L 5/221; H02K 1/14; H02K 1/146;
                     H02K 1/2753
  See application file for complete search history.

(56)                References Cited

U.S. PATENT DOCUMENTS

|  |  |  |  |
|---|---|---|---|
| 7,028,545 B2 | 4/2006 | Gandel et al. | |
| 7,644,635 B2 | 1/2010 | Prudham et al. | |
| 11,371,826 B2 | 6/2022 | Irle et al. | |
| 2006/0176189 A1 | 8/2006 | Bar-On | |
| 2021/0010793 A1* | 1/2021 | Irle ...................... | G01C 15/006 |

FOREIGN PATENT DOCUMENTS

| | | | |
|---|---|---|---|
| EP | 2383558 A1 | 11/2011 | |
| WO | WO2019185336 A1 | 10/2019 | |

\* cited by examiner

POSITION DETECTION FOR A ROTATION ANGLE SENSOR

This nonprovisional application is a continuation of International Application No. PCT/EP2022/055280, which was filed on Mar. 2, 2022, and which claims priority to German Patent Application No. 10, 2021 106 8703, which was filed in Germany on Mar. 19, 2021, and which are both herein incorporated by reference.

BACKGROUND OF THE INVENTION

Field of the Invention

The present invention relates to a position detection device for a rotation angle sensor, a rotation angle sensor with such a position detection device, and a system with such a rotation angle sensor.

Description of the Background Art

Rotation angle sensors are used in motor vehicles, for example. For instance, electric servo units are increasingly used for power assisted steering in motor vehicles. These units require the steering torque for control. The steering torques become recognizable as differential angles in a steering column by means of a torsion bar, and are calculated therefrom. To be more precise, rotations at ends of the torsion bar are identified by means of rotation angle sensors, and differential angles are derived therefrom. The differential angles that are produced by the torsion must be identified independently of a position of the steering wheel. Torque sensors are used in modern electric power steering systems as a human-machine interface, also referred to as HMI. The "force" that the driver applies to the steering wheel is measured by this means so that steering assistance can take place. Even in the future, with the elimination of the steering column and the establishment of so-called steer-by-wire systems, sensors for steering angle and possibly steering torque will be necessary at the steering system drive unit or at the "hand wheel sensor & actuator".

Furthermore, it is important for, e.g., driver assistance systems such as ESP (electronic stability program for the handling characteristics of the vehicle) to know the position (relative angular position) of the steering wheel. For this purpose, a steering angle of the steering wheel (angle relative to a reference position) is identified. An indexing is associated with the reference position so that angles greater than or less than 360° can also be identified.

In the case of magnetic torque sensors, it is known, for example, to generate a signal for each complete rotation of the steering wheel for indexing by means of a Hall sensor and an associated magnet, and thus to determine a number of rotations. A method often referred to as magnetic louver is used here, in which a change in the magnetic flux density takes place during the rotation. Associated sensors are also referred to as "torque only sensors" (TOS). These sensors are not capable of detecting a steering angle.

Examples of such torque sensors are described in EP 1 269 133 B1 (which corresponds to US 2004/0011138) and U.S. Pat. No. 7,644,635 B2.

Such devices for determining a rotation angle and/or a torque of a rotating part as well as methods for operating them are already known from the prior art in numerous embodiments. In general, sensors are known that measure both the torque at the steering wheel and the steering angle.

A method for determining a differential angle is known from DE 10 2004 019 379 A1 in which two rotation angles are identified and a differential angle is calculated therefrom. Different speed ratios between the rotations of two components are taken into account in calculating the differential angle. A multitude of rotations are disregarded.

An inductive angle sensor for determining torque and relative angular position with respect to a reference position is known from EP 2 383 558 A1, comprising means for detecting angles and differential angles, as well as means for indexing upon travel through the reference position, having a permanent magnet and a Hall sensor. In order to create a torque sensor with angle determination and indexing that is compact and economical to produce, a flux concentrating sheet that guides the flux of the permanent magnet to the Hall sensor in the reference position is associated with the Hall sensor.

A device for determining a rotation angle and/or a torque of a rotating part is known from WO2019/185338 A1, which corresponds to US 2021/0010793 and US 2021/0010881 and which are incorporated herein by reference. The device comprises at least one angle detector to detect an angular position of the rotating part relative to a reference position, and at least one indexer to index at a predetermined rotation, preferably a 360° rotation, of the rotating part relative to the reference position. The angle detector has a rotor that is connected in a rotationally fixed manner to the rotating part, which rotor has a main body for attachment to the rotating part and multiple vanes extending radially outward from the main body. At least one of the vanes of the rotor has a marking that is detectable by means of the indexer.

It is possible with the aid of such indexing to dispense with an absolute determination of the steering angle over the measurement range of typically 1440°. Instead, a type of contactless switch is added by means of the indexing, which generates a switch signal (index signal) in the case of straight-ahead driving. Previous embodiments of the index switch are magnetic, and necessitate an additional magnet and an additional integrated circuit. They are not very robust with regard to interference from external fields.

SUMMARY OF THE INVENTION

It is therefore an object of the present invention to provide a position detection device for a rotation angle sensor, a rotation angle sensor with such a position detection device, and a system with such a rotation angle sensor specified.

According to an example of the invention, a position detection device for a rotation angle sensor is provided. The position detection device has at least one stator, at least one rotor, and at least one evaluation unit. The at least one rotor has a main body and multiple rotor vanes extending radially outward from the main body. Multiple first rotor vanes of the multiple rotor vanes are designed differently from multiple second rotor vanes of the multiple rotor vanes. The evaluation unit is designed to detect when the multiple first rotor vanes reach, have reached, or exceed a predetermined rotational position, for example starting from a reference position.

For this purpose, the evaluation unit need not detect when the respective first rotor vane reaches, has reached, or exceeds a predetermined rotational position for each of the multiple first rotor vanes. By detecting that one of the multiple first rotor vanes reaches, has reached, or exceeds the predetermined rotational position, for example, it is possible to deduce that all of the multiple first rotor vanes have each moved or rotated by the same amount or angle.

For example, the evaluation unit can be designed to detect when the entirety of the multiple first rotor vanes reaches, has reached, or exceeds a predetermined rotational position, for example starting from a reference position.

The at least one stator can be arranged to be stationary relative to a rotating element. Segments that correspond in each case to the multiple first rotor vanes and the multiple second rotor vanes can be arranged on the at least one stator. The at least one rotor can be connectable to the rotating element in a rotationally fixed manner. The multiple first rotor vanes can each be designed identically. The multiple second rotor vanes can each be designed identically.

The evaluation unit can be designed to detect, based on a capacitive coupling between the at least one rotor and the at least one stator, when the multiple first rotor vanes reach, have reached, or exceed a predetermined rotational position, starting from a reference position. The evaluation unit can be designed not to detect the precise rotation angle of the at least one rotor vane on the basis of the capacitive coupling, but instead to detect when the multiple first rotor vanes reach, have reached, or exceed the predetermined rotational position, starting from a reference position. The predetermined rotational position can be, for example, a single fixed position relative to the circumference of the stator and/or of the rotor. For example, the predetermined rotational position can correspond to the reference position. According to this example, the predetermined rotational position can be reached again after every complete revolution of the multiple first rotor vanes, e.g., the entirety of the multiple first rotor vanes. According to another example, the predetermined rotational position can correspond to a rotation angle segment. The rotation angle segment can be less than 360°.

It can thus be said that the position detection device according to the first aspect operates capacitively. In this case, the at least one rotor functions as at least one electrode and the at least one stator functions as an associated electrode. The at least one rotor and the at least one stator can be at different potentials in this case. As a result, an electric field can be formed between the at least one rotor and the at least one stator. The value of a capacitance, and thus the strength of the electric field, is dependent upon various parameters. Among other factors, the strength of the electric field between the at least one rotor and the at least one stator depends on the material located between the at least one rotor and the at least one stator and/or on the distance of the relevant electrodes from one another. Furthermore, the value of a capacitance, and thus the strength of the electric field, depends on the capacitively acting, overlapping electrode areas. Changing the overlap of the electrode areas causes the capacitance value to change. The greater the overlap of the electrode areas, the greater the capacitance value is. The smaller the overlap of the electrode areas, the smaller the capacitance value.

The capacitive design of the position detection device is advantageous. Owing to increasing demands in the area of electromobility, the demands on limit values for EMC (electromagnetic compatibility) in the case of low-frequency magnetic fields are also increasing. Such very large magnetic fields arise especially at the high currents of the electric machines of a traction drive of an electric vehicle. Magnetic solutions are vulnerable with regard to EMC. The capacitive solution proposed herein provides an improvement in robustness with respect to magnetic fields as well as a simpler, and thus more cost-effective, solution.

The multiple first rotor vanes can be distinguished from the second rotor vanes on account of the different designs/ examples of the multiple first rotor vanes and the multiple second rotor vanes. It can be determined by the evaluation unit when, for example, the multiple first rotor vanes reach, have reached, or exceed a predetermined rotational position, starting from the reference position. The predetermined rotational position can be identical at every rotation. According to one example, there can be a single predetermined rotational position per complete rotation. It can be determined by the evaluation unit when, for example, the multiple first rotor vanes have each rotated by a predetermined rotation angle, e.g., by a full rotation of 360°, to the predetermined rotational position. In this way, every full rotation of the multiple first rotor vanes (which is to say a rotation by 360°), for example, can be determined. According to another example, there can be multiple predetermined rotational positions per complete rotation. It can be determined by the evaluation unit when, for example, the multiple first rotor vanes have each rotated by a predetermined rotation angle, e.g., by a rotation angle segment of, for example, 40°, to the predetermined rotational position. In this way, every rotation of the multiple first rotor vanes by a certain rotation angle segment (e.g., a rotation by 40°) can be determined.

The evaluation unit can be designed to generate a switch signal when the multiple first rotor vanes reach, have reached, or exceed the predetermined rotational position. The evaluation unit can be designed to generate a switch signal when it establishes that the multiple first rotor vanes reach, have reached, or exceed the predetermined rotational position. The switch signal can be a logical switch signal that can be transmitted through an electronic, digital interface together with additional sensor or diagnostic data. For example, a counter can be increased or decreased in a direction-dependent manner, e.g., by 1, every time a switch signal is generated. In this way, a type of indexing can be achieved. It is possible with the aid of such indexing to dispense with an absolute determination of the steering angle over the measurement range of typically 1440° by means of angle sensors and transmission reductions. Instead, a type of contactless switch or counter is added by means of the indexing, which generates a switch signal (index signal), for example in the case of straight-ahead driving and/or when the predetermined rotational position is reached. The position detection device can thus also be considered a type of switch, and referred to as a switch, for example. If an angle sensor on the steering system unambiguously detects a steering angle subrange, the direction-dependent switch signal can be used to count the steering angle subranges, and thus to achieve an unambiguous derivation of an overall measurement range by adding the counter value multiplied by the steering angle subrange to the angle within the steering angle subrange. In this case, a subrange, for example, is specified for a selectable implementation by the number of vanes of the rotor of, for instance, 9, which results in the steering angle subrange of 360°/9=40° that is to be unambiguously measured.

Previous implementations of such an index switch are magnetic, requiring an additional magnet and an additional integrated circuit. The capacitive solution presented herein is more robust with regard to interference from external fields.

For example, the counter can be increased or decreased by 1 every time the multiple first rotor vanes reach, have reached, and/or exceed, in a direction-weighted manner, a specified rotation angle segment as the predetermined rotational position. In this way, the reaching or exceeding of certain rotation angle segments, for instance of 40°, can be counted. The rotation angle can then be derived accordingly from the counter value with no need to detect the rotation angle itself. If the angle subrange is, e.g., 40°, which is to say the counter is increased or decreased every time a rotation angle segment of 40° reached, then a rotation angle of 4*40°=160° can be derived in the case of a counter value of 4 with a specified direction.

An index switch can be implemented with the aid of the evaluation unit, the evaluation unit can be arranged in such an index switch, or the rotation angle sensor can be implemented as such an index switch. The index switch can be suitable in the case of straight-line motion of the steering system, for example. It can be assumed that right and left bends should normally alternate on roads. If straight-line motion is then found and validated as the index point, then the rollovers of the motor position sensor for commutating this motor or the traversal of the specific angle segments, for example 40° segments, of a rotation angle sensor can, in particular, be counted.

In the case of the torque sensors known from the conventional art with a magnetic louver, the steering angle is not sensed with the magnetic louver, as described above. A counting of angle segments/angle subsections by indexing is accordingly not possible. Consequently, an index switch and a counter appear actually to be unnecessary. However, an index switch and an associated counter are advantageous even in this context, because an additional position sensor is implemented on this motor to drive the electric motor for the power steering and to commutate the same. On account of the transmission ratio of the steering gearbox of approximately 20-30, the sensor signal does indeed repeat quite frequently, but can be counted after indexing. In this way, it is possible to infer (indirectly, as it were) an angle sensor value for the steering angle.

In order to unambiguously determine rotation angles that are greater than a full rotation (360°), it is conceivable that, even though multiple first rotor vanes exist, only a single first rotor vane is nevertheless used for indexing. For this purpose, the evaluation unit can be designed to detect when a single/sole first rotor vane of the multiple first rotor vanes, and thus the entirety of the multiple first rotor vanes, reaches, has reached, or exceeds a predetermined rotation angle, such as a rotation angle of 360°. The evaluation unit can be designed, for example, to detect when the single/sole vane of the multiple first rotor vanes reaches, has reached, or exceeds an index position. The evaluation unit can be designed to generate a switch signal when it establishes that the single vane of the multiple first rotor vanes reaches, has reached, or exceeds the predetermined rotation angle, for example the index position.

The multiple first rotor vanes can have a different shape than the multiple second rotor vanes. In addition or alternatively, the multiple first rotor vanes can have a different area or surface than the multiple second rotor vanes.

The multiple first rotor vanes can be designed as hollow vanes and the multiple second rotor vanes as solid vanes. The multiple first rotor vanes can be designed as solid vanes and the multiple second rotor vanes as hollow vanes. "Hollow vane" can be understood here to mean a rotor vane which or in whose surface a cavity or an opening is formed. "Solid vane" can be understood here to mean a rotor vane which or whose surface is completely filled. A different area or surface of the multiple first rotor vanes on the one hand, and of the multiple second rotor vanes on the other hand, can be achieved owing to the implementation as hollow vanes and solid vanes. Accordingly, the strength of the electric field generated by means of the multiple first rotor vanes can differ from one another by the strength of the electric field generated by means of the multiple second rotor vanes. The multiple first rotor vanes can thus be distinguished from the multiple second rotor vanes (on the basis of different capacitive couplings to the stator, for instance).

The multiple first rotor vanes can be designed to be longer and/or wider than the multiple second rotor vanes. The multiple first rotor vanes can be designed to be shorter and/or narrower than the multiple second rotor vanes. A different shape (and thus a different area or surface) of the multiple first rotor vanes on the one hand, and of the multiple second rotor vanes on the other hand, can be achieved owing to the longer, wider, shorter, and/or narrower implementation.

The multiple first rotor vanes and the multiple second rotor vanes can be arranged in a predetermined sequence relative to one another. The predetermined sequence can be implemented in such a manner that the evaluation unit can unambiguously establish when a single/a sole vane of the multiple first rotor vanes reaches, has reached, or has exceeded the predetermined rotation angle, for example the index position.

The number of the multiple rotor vanes can be nine, the number of the multiple first rotor vanes three, and the number of the multiple second rotor vanes six. The predetermined sequence of the multiple first rotor vanes and of the multiple second rotor vanes relative to one another can be as follows: second rotor vane, first rotor vane, second rotor vane, second rotor vane, first rotor vane, second rotor vane, second rotor vane, second rotor vane, first rotor vane. In this case, the evaluation unit can be designed, for example, to unambiguously detect one of the first rotor vanes, for example rotor vane number 2, rotor vane number 5, or rotor vane number 9, and/or to detect the entirety of the first rotor vanes. Any of the first rotor vanes can be used for indexing. Regardless of which of the first rotor vanes is used for indexing, it is always possible to determine when the entirety of the first rotor vanes reaches, has reached, or exceeds the predetermined rotation angle. Accordingly, the evaluation unit can be designed to use rotor vane number 5, for example, for indexing. As soon as rotor vane number 5, and thus the entirety of the first rotor vanes, reaches, has reached, or has exceeded the predetermined rotation angle, for example the index position, the evaluation unit can output a switch signal. This switch signal can cause an indexing, for example an increasing of a counter by one. A further rotation of rotor vane number 5 by the predetermined rotation angle, for instance to the index position, for example by a rotation angle of 360°, can again cause an indexing, for example an increasing of the counter by one. In this way, rotation angles of multiple complete rotations can be detected, for example by incrementing a counter. Shifts of the exemplary sequence forward or backward (to the left or to the right; clockwise or counterclockwise) are possible, wherein it is not actually the detected rotor vane that changes accordingly, but the position of the detected rotor vane within the sequence.

Based on the aforementioned sequence or another sequence, the evaluation unit can be designed to detect when the single/sole vane, for example rotor vane number 5, and thus the entirety of the multiple first rotor vanes, reaches, has reached, or exceeds a predetermined rotation angle, and to generate a switch signal when the single/sole vane of the multiple first rotor vanes, and thus the entirety of the multiple first rotor vanes, reaches, has reached, or exceeds the predetermined rotation angle. The evaluation unit can carry out this detection on the basis of the sequence of the rotor vanes, even though the multiple first rotor vanes are designed identically.

The multiple first rotor vanes and the multiple second rotor vanes can be arranged relative to one another in such a manner that the switch signal is generated only once per rotation through the predetermined rotation angle. In other words, the multiple first rotor vanes and the multiple second rotor vanes can be arranged relative to one another in such a manner that the switch signal is generated only when the single/sole first rotor vane of the multiple first rotor vanes or the entirety of the multiple first rotor vanes reaches, has reached, or exceeds the index position. This can be derived from different capacitive coupling(s) of the rotor vanes with the stator.

The multiple first rotor vanes and the multiple second rotor vanes can be arranged relative to one another in such a manner as to enable the evaluation unit to recognize that a single first rotor vane of the multiple first rotor vanes or the entirety of the multiple first rotor vanes reaches, has reached, or exceeds an index position. In other words, the multiple first rotor vanes and the multiple second rotor vanes can be arranged relative to one another in such a manner that it is recognized when the single/sole first rotor vane of the multiple first rotor vanes or the entirety of the multiple first rotor vanes reaches, has reached, or exceeds the index position. This can be achieved by the means that only the single/sole vane of the multiple first rotor vanes is detected each time, not the multiple first rotor vanes or all of the multiple first rotor vanes, or the entirety of the multiple first rotor vanes, even though the multiple first rotor vanes are identically designed.

The multiple first rotor vanes can be connected to form a first capacitor. The multiple second rotor vanes can be connected to form a second capacitor. From this connection and the signals produced by means of the capacitors, the evaluation unit can detect when the entirety of the multiple first rotor vanes reaches, has reached, or exceeds the predetermined rotation angle.

The rotating element (which can also be referred to as a rotary element) can have a torsion bar or be designed as a torsion bar. The at least one stator and/or the evaluation unit can be arranged on a printed circuit board. The rotating element can extend through the printed circuit board and the at least one rotor.

According to a second aspect, a rotation angle sensor is provided. The rotation angle sensor has the position detection device as is/has been described herein. The rotation angle sensor additionally has a rotation angle determination device. The rotation angle determination device has the at least one stator, the at least one rotor, and the evaluation unit. The evaluation unit is designed to determine a rotation angle of the at least one rotor relative to the at least one stator, starting from the reference position.

The position detection device according to the first aspect can be combined with a rotation angle determination. For instance, a capacitively operating index switch can be combined with an inductively operating rotation angle determination device.

The evaluation unit can be designed to determine the rotation angle of the at least one rotor based on an inductive coupling between the at least one rotor and the at least one stator. The evaluation unit can determine the rotation angle of the at least one rotor up to a partial or complete rotation, for example as an intermediate result. Furthermore, the evaluation unit can be designed to determine the value of the above-described counter. The value of the counter can indicate the number of partial or complete rotations of the at least one rotor vane of the rotor. The overall rotation of the rotor that has taken place can be determined by the evaluation unit from the intermediate result (for example, the rotation angle up to 360°) and the value of the counter. The partial rotation angle can be, e.g., an angle segment. According to one example, exceedances of a respective angle segment, which is to say segment exceedances, can be counted in each case. The angle segment can be, for example, an angle segment of 20° or 40°, which is to say in this case the counter is increased or decreased every time after the angle segment is reached or exceeded depending on the direction of the exceedance by 20° or 40°. In particular, the angle signal can repeat at certain intervals, for example every 20° or 40°, and in this way it is possible to calculate to a steering angle of, e.g., 1440°.

The at least one rotor can be designed as two rotors. The evaluation unit can be designed to determine the rotation angle of a first of the two rotors and the rotation angle of a second of the two rotors. The evaluation unit can be designed to determine the total rotation of the first of the two rotors from the determined rotation angle (up to a complete rotation) and the value of the counter. The evaluation unit can be designed to determine the total rotation of the second of the two rotors from the determined rotation angle (up to a complete rotation) and the value of the counter. The first rotor can be arranged at one end of the rotating element. The second rotor can be arranged at another end of the rotating element. The evaluation unit can be designed to derive the torque acting on the rotating element from the rotation angle or the total rotation of the first rotor and the rotation angle or the total rotation of the second rotor. For example, the evaluation unit can be designed to determine a differential angle between the rotation angle or the total rotation of the first rotor and the rotation angle or the total rotation of the second rotor. From the differential angle, the torque acting on the rotating element can be derived by the evaluation unit.

According to a third aspect of the invention, a system is proposed. The system has a rotation angle sensor such as is/has been described herein. The system additionally has a rotating element. The at least one stator of the rotation angle sensor is arranged to be stationary relative to the rotating element. The at least one rotor is connected to the rotating element in a rotationally fixed manner. The evaluation unit of the rotation angle sensor is designed to determine, from the determined rotation angle or the total rotation of the at least one rotor, a torque affecting the rotating element. The rotating element can have a torsion bar or be designed as a torsion bar.

The evaluation unit can be designed to determine, from the determined rotation angle or the total rotation of the at least one rotor, a torque acting on the rotating element. For example, the evaluation unit can be designed to derive the torque acting on the rotating element from the determined rotation angle or the total rotation of the at least one rotor.

The rotation angle sensor described and the system described can be wholly or partially implemented with the aid of a computer program. Thus, a computer program product with program code sections can be provided for carrying out the method. The computer program can be stored on a computer-readable storage medium or in the rotation angle sensor and/or the system, for example in the evaluation unit. When the program code sections of the computer program are loaded into a computer, computing device, or processor (for example, a microprocessor, microcontroller, or digital signal processor (DSP), hard-wired digital logic in an ASIC), or are running on a computer, computing device, or processor, they can cause the computer or processor to execute one or more steps or all steps of the technique described herein.

Despite the fact that some of the above-described aspects and details have been described with respect to the rotation angle sensor, these aspects can also be realized in corresponding fashion in the system having the rotation angle sensor or in a computer program supporting the rotation angle sensor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3b is an autocorrelation function of the rotor coding of the rotor from FIG. 3a;

DETAILED DESCRIPTION

Specific details are set forth hereinbelow, without being restricted thereto, in order to provide a complete understanding of the present invention. It is clear to a person skilled in the art, however, that the present invention can be used in other exemplary embodiments that can differ from the details set forth below.

It is furthermore clear to the person skilled in the art that the explanations set forth below can be implemented through the use of hardware circuits, software means, or a combination thereof. The software means can be associated with programmed microprocessors or a general computing device, a computer, an ASIC (Application Specific Integrated Circuit) and/or DSPs (Digital Signal Processors). It is furthermore clear that even when the details below are described with reference to a method, these details can also be realized in a suitable device, a computer processor, or a memory connected to a processor, wherein the memory is provided with one or more programs that carry out the method when they are executed by the processor.

Figure 1:
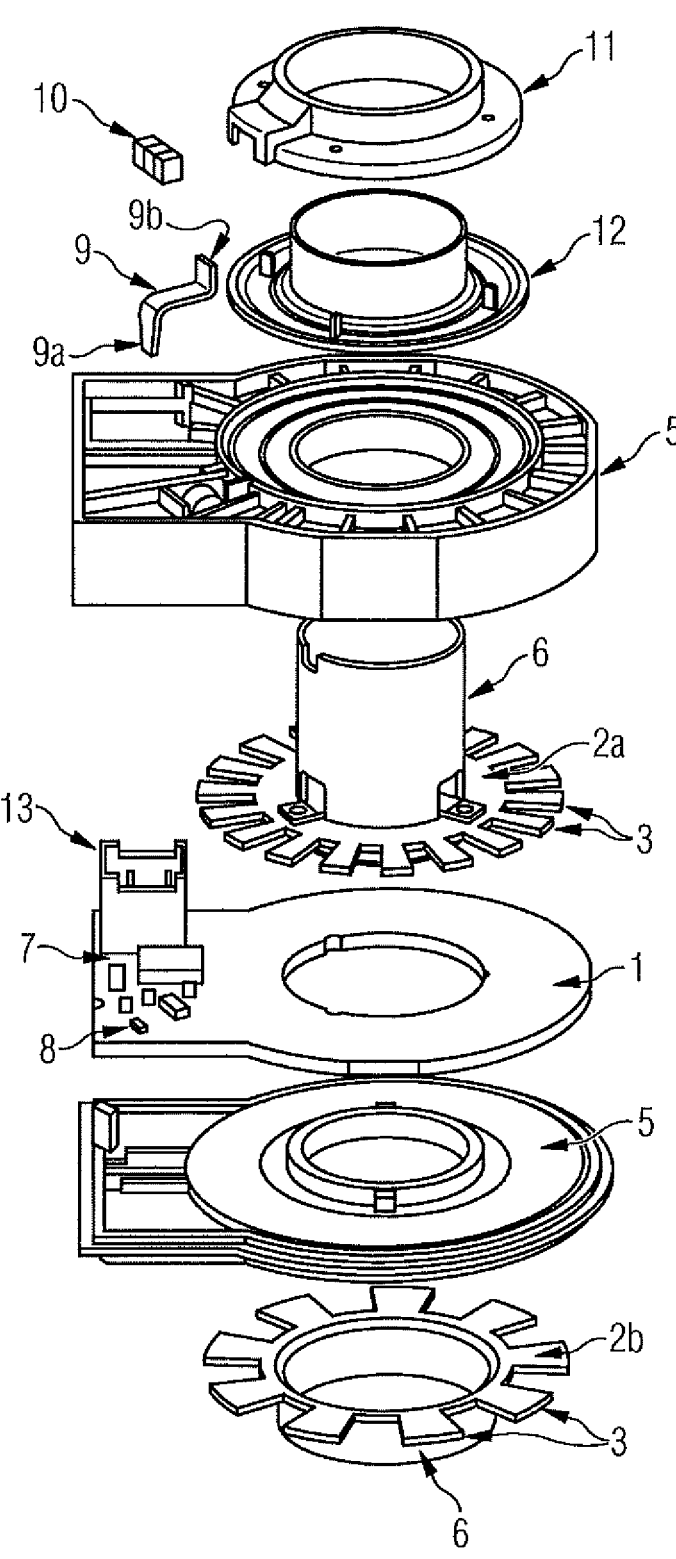
FIG. 1 is an exploded view of an inductive torque sensor from the conventional art.

FIG. 1 shows an inductive torque sensor known from the prior art. The inductive torque sensor includes a printed circuit board 1 and two rotor disks 2 (or, for short, two rotors 2), wherein the rotor disks 2 have different rotor structures 3 with feature sizes of, e.g., 20° and 40°, respectively. The rotor disks 2 are largely parallel and are arranged on a common shaft, which here is formed by a torsion bar. The latter is part of a steering shaft here. The rotor disks 2 are distributed at short distances from both main surfaces of the printed circuit board 1. The printed circuit board 1 and a first of the rotor disks 2a are enclosed by a housing 5 in a largely sealed manner. A second of the rotor disks 2b is mounted outside on the housing 5 at a minimal distance. The rotor disks 2, the printed circuit board 1, and the housing 5 each have an opening for the torsion bar. The openings are aligned accordingly.

Each rotor disk 2 is attached in a rotationally fixed manner to the torsion bar by means of a support structure 6, wherein said torsion bar has a torsion element between the rotor disks 2. The one-piece support structure 6 includes a tube-like part, the inside diameter of which corresponds to the diameter of an associated part of the torsion bar plus a predefined small play, and to which the corresponding rotor disk 2a, 2b are attached. A disk 12 is attached from the outside to the support structure 6 of the first rotor disk 2a, which is arranged in the housing 5, and closely adjoins the housing 5 here. In this way, the torque sensor is self-stabilized against tilting, thus minimizing measurement errors in this regard.

Formed on the printed circuit board 1 are four stators that, in connection with the two rotors 2, form four angle sensors. Together with the requisite excitation structures, the stators are deposited on the two main surfaces of the printed circuit board 1 as conductive traces, and contacted, in a known manner. The structures of the stators are matched to the structures of the rotor disks 2a, 2b.

At least one application-specific integrated circuit (ASIC) 7 is additionally arranged on the printed circuit board 1. Each circuit 7 has at least two channels. Where applicable, at least one evaluation unit is downstream of the circuit 7. The circuit 7 and, if applicable, the at least one evaluation unit form the means for evaluation.

A connector 13 with appropriate contact pins is attached to the printed circuit board for electrical connection to, e.g., a control unit and, where applicable, to the evaluation unit.

In operation, the rotors 2 are turned relative to the stators by means of the torsion bar. In this way, corresponding signals are conducted into the channels of the circuit 7, and calculated to rotation angles starting from a specified zero position. As a function of a torque exerted on the steering rod through a steering wheel, the torsion bar twists by a certain angle so that the two rotors 2 are turned through correspondingly different rotation angles. From these different rotation angles, a differential angle is calculated from which the torque exerted on the steering rod is determined.

Moreover, a number of complete rotations of the torsion bar can be determined by means of a Hall sensor 8, a permanent magnet 10, and a flux concentrating sheet 9: Once the torsion bar is rotated axially and the permanent magnet 10 passes through the reference position, the magnetic flux is conducted by the flux concentrating sheet 9 to the Hall sensor 8, which thereupon emits a switch signal, which is counted. The number 1 is added or subtracted for each switch signal, depending on the direction of rotation of the torsion bar; an actual steering angle position can be determined from the total in combination with the signal of the rotation angle.

In addition to the rotor, for example rotor 2, each of the angle detectors also has a stator. In the case of inductive sensors, the stator is constructed in a manner known to the person skilled in the art and has at least one excitation coil and at least one sensor coil. In the present example, the respective stator is arranged on a single multilayer printed circuit board 8, which is shown by way of example in FIG. 2. The multilayer printed circuit board 8 has a total of six layers, which are labeled L1, L2, L3, L4, L5, and L6 in FIG. 2. The individual layers L1 to L6 are deposited on circuit board material, which is symbolized in FIG. 2 by differing textures for the purpose of greater clarity. The stator of the angle detector partially shown in FIG. 1 is arranged on the layers L1 and L2 of the printed circuit board 8, and the stator of the angle detector that is not shown in FIG. 1 is arranged on the layers L5 and L6 of the printed circuit board 8. On the one hand, the indexer designed as an inductive sensor is arranged on the layers L3 and L4 of the printed circuit board 8. On the other hand, the layers L3 and L4 of the printed circuit board 8 are additionally designed as shielding, by which means an unwanted interaction is at least reduced between the angle detectors designed as inductive sensors whose stators are arranged on the layers L1 and L2 as well as on the layers L5 and L6 of the printed circuit board 8. Only the layers L1 to L6 are shown in FIG. 2, but not the stators and not the indexer designed as an inductive sensor.

Figure 2:
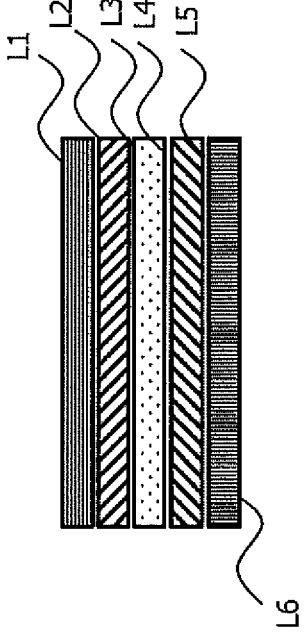
FIG. 2 is a schematic representation of a multilayer printed circuit board.

Present-day torque sensors are fundamentally based on the principles described with respect to FIGS. 1 and 2 or on the principles with magnetic louver likewise outlined above. A so-called torsion bar, which twists when a torque is introduced, is an integral part of a modern power steering system. The two ends of the torsion bar are often referred to as the "input shaft" and "output shaft" (or herein also as "input side" and "output side"). In modern technologies, some of which are also referred to as CIPOS structures, multiple measuring channels are accommodated in a multi-layer printed circuit board (PCB=Printed Circuit Board), such as was described with respect to FIG. 2, for example. In particular, the layers L1, L2 implement measuring channels that measure the angle of the input shaft, the layers L3, L4 are shielding layers, and the layers L5, L6 contain measuring channels for measuring the angle at the output shaft. The difference between the angles at the input shaft and output shaft represents the twisting of the torsion bar and is proportional to the torque that the driver exerts on the steering wheel to steer.

In particular, CIPOS sensors are designed such that an eighteen-vane CIPOS sensor (IS) with an eighteen-vane rotor (IS-R) with an unambiguous range of 360°/18=20° is formed on the input shaft side (input side), and a nine-vane rotor (OS-R) with an absolute measurement range of 40° is formed on the output shaft side (output side). The rotors with the nine (or eighteen) vanes are implemented through options including metallic stamped and bent parts or they are plastic parts that contain electrically conductive areas or they are overmolded stamped parts.

The details described with respect to FIGS. 1 and 2 describe an inductively operating rotation angle sensor. In the case of such a rotation angle sensor, it is complicated to distinguish a specific rotation angle from a rotation angle that is rotated through a full rotation. This is why consideration was given to using an indexing once a full rotation has been reached.

To this end, consideration was given to modifying the areas of the rotors by recessing in order to make them distinguishable. Full-area rotor vanes and hollow vanes become distinguishable by means of the areas of the rotors modified by recessing. Thus, for example, a modified vane can be distinguished from the other vanes and an indexing can take place once the modified vane has moved through a full rotation. In other words, the rotor of an angle detector for detecting an angular position of the rotating part relative to a reference position additionally serves the purpose of indexing at a previously defined rotation, preferably a 360° rotation, of the rotating part relative to the reference position by means of the indexer.

The inductive sensor (CIPOS) described with respect to FIGS. 1 and 2 uses primarily the outer contour of a vane and not the area itself. For inductive detection of the position (CIPOS), full areas always tend to be negative in principle, since eddy currents can develop freely. The implementation with hollow and solid vanes thus represents an inductive asymmetry, albeit a small one, which is disadvantageous for measurement. New designs are thus desirable.

Consideration was previously given to modifying the area of a single one of the rotor vanes by recessing in order to make this one distinguishable from the other rotor vanes. The full-area rotor vanes and the one hollow vane become distinguishable by means of the area modified by recessing. In other words, consideration was given to providing a single marked vane. If this single, marked vane reaches a full rotation, then the indexing switches.

Figure 3A:
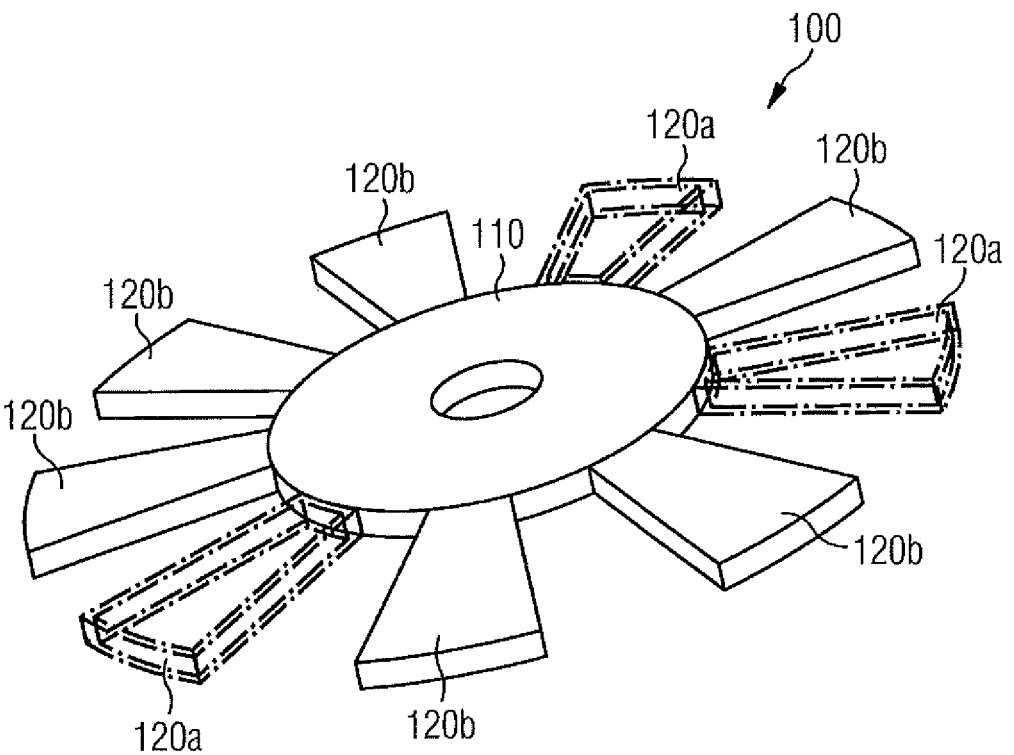
FIG. 3a is a view of a rotor according to an example.
Figure 3B:
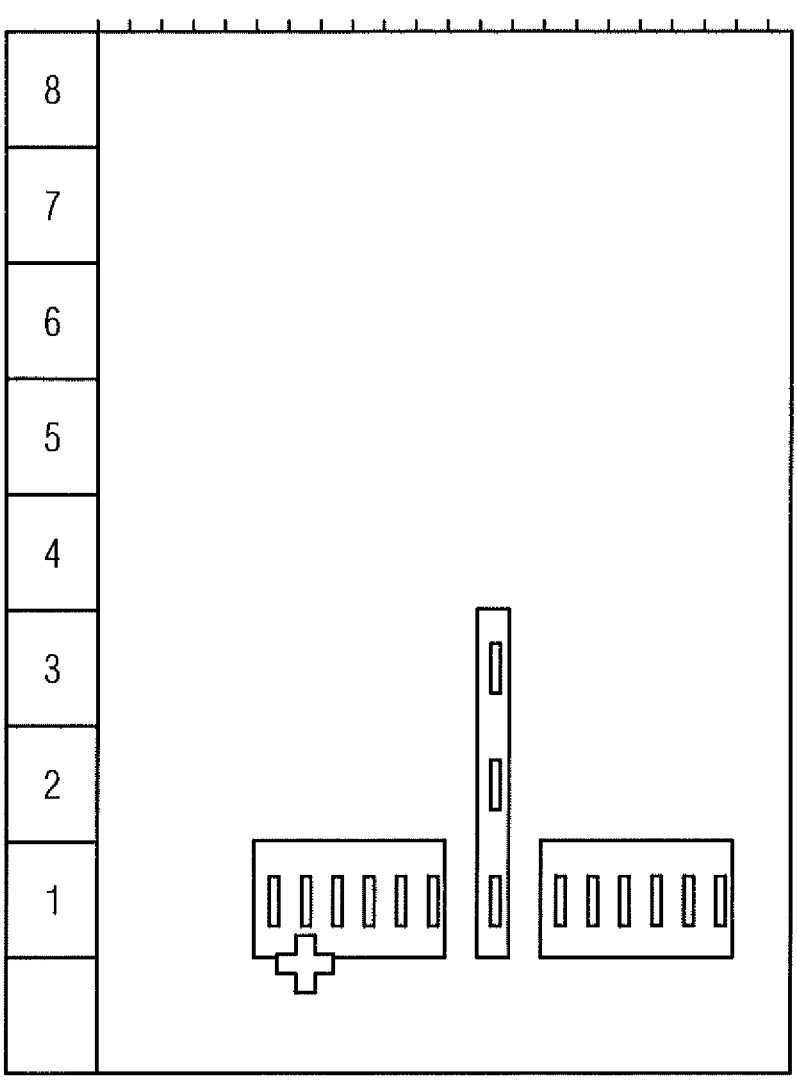

FIG. 3a shows a rotor of a capacitively acting position detection device and/or of a rotation angle sensor with such a capacitively acting position detection device. The basic structure of the rotation angle sensor can correspond to the basic structure of the inductive sensor from FIG. 1. However, alternative designs are likewise possible, for instance torque sensors with magnetic louver. In the following, a structure of the rotor of a capacitively acting position detection device and/or of a rotation angle sensor with such a position detection device is described with reference to FIGS. 3a to 3d.

The capacitively acting position detection device has at least one stator (see exemplary stator 200 in FIG. 3c), at least one rotor 100, and an evaluation unit. The at least one stator 200 can be arranged to be stationary relative to a rotating element. This means that the stator does not rotate along with a rotation of the rotating element when the stator is connected to the rotating element. The at least one rotor 100 can be connected to the rotating element in a rotationally fixed manner. This means that the rotor 100 rotates along with a rotation of the rotating element when the rotor is connected to the rotating element in a rotationally fixed manner. The at least one rotor 100 has a main body 110 and, by way of example, multiple rotor vanes 120a, 120b extending radially outward from the main body 110. Multiple first rotor vanes 120a and multiple second rotor vanes 120b are provided as the multiple rotor vanes 120a, 120b. The multiple first rotor vanes 120a and the multiple second rotor vanes 120b are designed differently from one another. In other words, the multiple first rotor vanes 120a of the multiple rotor vanes 120a, 120b are designed differently from the multiple second rotor vanes 120b of the multiple rotor vanes 120a, 120b. The evaluation unit is designed to detect when the multiple first rotor vanes 120a reach, have reached, or exceed a predetermined rotation angle.

The rotor 100 from FIG. 3a can have, by way of example, a rotor carrier that is not shown. The rotor carrier can be designed to support the main body 110 and thus the rotor vanes 120a, 120b. For example, the rotor carrier and the rotor vanes 120a, 120b can be permanently connected to one another. The rotor carrier can have a metal or be made of a metal. In addition or alternatively, the rotor carrier can have a plastic or be made of a plastic. The rotor carrier can also be dispensed with, however. The main body 110 can have a metal or be made of a metal. In addition or alternatively, the main body 110 can have a plastic or be made of a plastic. In the example from FIG. 3a, the main body 110 is composed of a metal by way of example. The rotor vanes 120a, 120b can have a metal or be made of a metal. In addition or alternatively, the rotor vanes 120a, 120b can have a plastic or be made of a plastic. In the example from FIG. 3*a*, the rotor vanes 120*a*, 120*b* are composed of a metal by way of example.

In principle, it can be said that a capacitive sensor uses the area of a rotor vane. The area is the capacitor area or part of the capacitor area, as it were. The inductive sensor (CIPOS) uses primarily the outer contour of a vane and not the area itself. A torsion bar is assumed as a rotating element in the following.

In the example from FIG. 3*a*, the rotor 100 has nine rotor vanes 120*a*, 120*b*. A different number of rotor vanes 120*a*, 120*b* is conceivable and possible, for example eighteen rotor vanes 120*a*, 120*b* for the input shaft (for the input side). Of the nine rotor vanes 120*a*, 120*b*, three are implemented as first rotor vanes 120*a* by way of example. Of the nine rotor vanes 120*a*, 120*b*, six are implemented as second rotor vanes 120*b* by way of example. In the example from FIG. 3*a*, the first rotor vanes 120*a* are each identical to one another. In the example from FIG. 3*a*, the second rotor vanes 120*b* are each identical to one another. The first rotor vanes 120*a* differ from the second rotor vanes 120*b*. In the example from FIG. 3*a*, the first rotor vanes 120*a* have a recess or opening, at least partly or in sections. The recess or opening can pass completely through each of the first rotor vanes 120*a*, but can also be arranged on only one side, for example an underside, of each of the first rotor vanes 120*a*. On account of the recesses or openings in the first rotor vanes 120*a*, the first rotor vanes 120*a* are also referred to as partially hollow, or as hollow vanes 120*a* for short. Furthermore, the second rotor vanes 120*b* are designed to be completely filled in the example from FIG. 3*a*, and can therefore also be referred to as solid vanes 120*b*. Alternatively, the first rotor vanes 120*a* can be designed as solid vanes and the second rotor vanes 120*b* as hollow vanes. In addition or alternatively to the previously mentioned design possibilities, it is conceivable that the area of the first rotor vanes 120*a* differs from the area of the second rotor vanes 120*b*. The first rotor vanes 120*a* can, for example, be designed to be larger (see the example from FIG. 3*d*) or wider than the second rotor vanes 120*b*. Alternatively, the first rotor vanes 120*a* can be designed to be shorter or narrower than the second rotor vanes 120*b*.

The different design of the first rotor vanes 120*a* (for example, in accordance with FIG. 3*a* or in accordance with FIG. 3*d*) in comparison with the second rotor vanes 120*b* results in a type of marking of the first rotor vanes 120*a* relative to the second rotor vanes 120*b*, which is to say the first rotor vanes 120*a* can be distinguished from the second rotor vanes 120*b*. In other words, the first rotor vanes 120*a* can be distinguished from the second rotor vanes 120*b* on the basis of their dissimilar design. If the first rotor vanes 120*a* are each identical, they cannot be distinguished from one another on the basis of their design, however. This would have the consequence that an indexing takes place, e.g., a counter is increased, not only when a specific vane of the first rotor vanes 120*a* reaches an index position, but also when another vane of the identical first rotor vanes 120*a* passes through the detection location. In consequence, the counter would be incremented incorrectly and, to be more precise, much too often.

This is why the rotor vanes 120*a*, 120*b* are coded in such a manner that a more precise distinguishability is made possible. More specifically, coding is carried out of such a nature that a first rotor vane 120*a*/a single first rotor vane 120*a* or the entirety of the first rotor vanes 120*a* or a reaching of the index position by the single/sole first rotor vane 120*a* or by the entirety of the multiple first rotor vanes is unambiguously detectable. For example, a complete rotation of 360° of the single/sole first rotor vane 120*a* of the multiple first rotor vanes 120*a* can be recognized every time, and switching can take place, which is to say the index counter can be increased, after every complete rotation.

For this purpose, a specific, nonarbitrary coding of the rotor vanes 120*a*, 120*b* of the capacitively sensed position sensor is provided, which is intended to generate a switch signal at a certain position (index position) over the circumference of 360°. This switch signal is also referred to as an index signal. If such index signal switches are designed such that a single rotor vane has a marking, then the implementation of the indexing is easy to understand. If the marking is implemented through the design as hollow vanes (see FIG. 3*a*) or as an elongated vane (see FIG. 3*d*), then the capacitive coupling originating from this marked vane is compared to the capacitive coupling of a rotor vane designed as a solid vane (see FIG. 3*a*) or as a shortened rotor vane (see FIG. 3*d*). The marked rotor vane can be recognized/detected from the different capacitive coupling.

The use of only one, single, marked vane is not optimal, because only a single vane contributes to the evaluation. This is the reason why a coding as a pattern or sequence of marked and unmarked vanes is proposed herein. What is important here is that the index signal is generated only once per rotation through 360° at one predetermined location (index point or index position). For this purpose, the coding must be strongly irregular, which is to say must, to the greatest extent possible, exhibit no symmetrical structures or geometric repetitions. An explanation of what irregular coding should be understood to mean shall now be provided here before a concrete implementation of the coding is described.

The coding proposed herein is based on codings that belong to the class of so-called pseudo-random noise (PRN) sequences. Important technical applications of these codings are to be found in communications technology in the modulation of signals and in satellite-assisted navigation, such as GPS. Ternary codings are frequently used in the mathematical descriptions and for the communications technology applications. In this context, ternary means that the code recognizes three states for every digit position (bit), these states being indicated with +1, −1, 0.

For the present application of codings in a position sensor, however, the codes are reduced to binary codes. Every digit position (bit) of the code can take on the states 0 or 1 in each case. It is assumed by way of example that 0 corresponds to an unmarked vane and 1 corresponds to a marked vane. This assignment can also be reversed. All codings have a length n, which corresponds to the number of vanes of the position sensor in the case described here. The code repeats after the length n.

The properties and efficacy of the coding used can be examined by mathematically folding the code with itself. This process is also known as the autocorrelation function (ACF) method. Figuratively speaking, one writes the code two times, one below the other, multiplies them together bit by bit, and then takes the sum. After this, one shifts the code one place to the right. The empty place resulting on the left is replaced on a rolling basis with the bit shifted out on the right. The bitwise multiplication and summation of all bits is performed again. The code is shifted in accordance with its length n. In other words, one envisions an initially random appearing series of 0, 1 or −1, +1 as a sequence. One writes two identical codes, one below the other, and forms the result by multiplying together the two code values in each column and, from the result, subsequently taking the sum as a number. Now one shifts, e.g., the bottom code by one place and repeats the process.

Good codings exhibit a largest possible value in only one place (with no shifting of the bits) and a smallest possible value for each of the shifts that are carried out. The codings by the mathematician Barker and the Barker codes named after him exhibit another special property that can be used here as well. It is the case for these codes that the same result is always produced for all shifts, and a "peak" occurs only for the unshifted code. The lengths of the Barker codes are limited, however. Aside from the trivial codes<7, only Barker codes with lengths 7, 11, and 13 are known. In detail, the Barker code of length 7 increases from 2 to 4 at the index point, corresponding to a doubling of the signal amplitude. The Barker code of length 11 increases from 2 to 5, which is to say a gain of 2.5. The Barker codes of lengths 7 and 11 read as follows:

Barker code of length 7:

1 1 1 0 0 1 0

Barker code of length 11:

1 1 1 0 0 0 1 0 0 1 0

It is the case for Barker codes that they deliver a high value only when the two codes are located one exactly above the other. The value is relatively small for all shifted codes, wherein, moreover, Barker codes have the unusual feature that this small value also is always equal in size for every shift. Thus, these Barker codes, the Barker 7-bit and Barker 13-bit, provide good results.

However, the rotor 100 has nine vanes and not seven or thirteen, so these codes are not suitable for the present problem, and therefore serve only to aid comprehension.

The coding can find application for the steering angle sensors and steering torque sensors described (also referred to as TAS: torque & angle sensor). Reference is made here to the discussion above with regard to the operating principle of TAS sensors.

As described previously, one of the rotors of these sensors is designed with nine vanes in the present day. The unambiguous measurement range of 40° resulting from nine vanes, and one half thereof at 20° (for rotors with 18 vanes), are typical measurement ranges for the torsion of the torsion bar used in the sensor and the torsional stiffness thereof. From this perspective, a coding with 9 bits is accordingly necessary for nine vanes. A coding of this nature with advantageous properties that are described below in greater detail is referred to below as EX9, and reads as follows:

EX9 coding:

0 1 0 0 1 0 0 0 1

The EX9 coding exhibits a very beneficial and advantageous behavior with regard to the ACF, which at least very closely approximates that of a Barker code. In this case, a typical graphical curve results for the ACF, such as is shown schematically in FIG. 3b where only the shifts by whole digits have been considered. The beneficial, advantageous property of this coding is that it has a result of 1 over wide regions outside the index point. In the vicinity of the index point, the result is initially 0, and then rises to a value of 3 at the correlation peak. The switching edge arising from 0 to 3 is thus especially steep, which can contribute to an improved switching accuracy. In other words, the peak at the value of 3, together with the value of 0 directly around the index point, has the result that the coding permits very good detectability of the single/sole first rotor vane of the multiple first rotor vanes 120a at the index position.

The coding triples the amplitude. For this reason, an effective signal amplification can be achieved with the EX9 coding for the capacitive evaluation of an arrangement of marked 120a and unmarked rotor vanes 120b of a position sensor with switching function. Instead of just a single vane, multiple vanes contribute to an evaluation, in contrast to an example with only a single marked vane. In this way, the signal amplitude is increased significantly, which makes the functioning of such a sensor more robust and more precise.

Figure 3C:
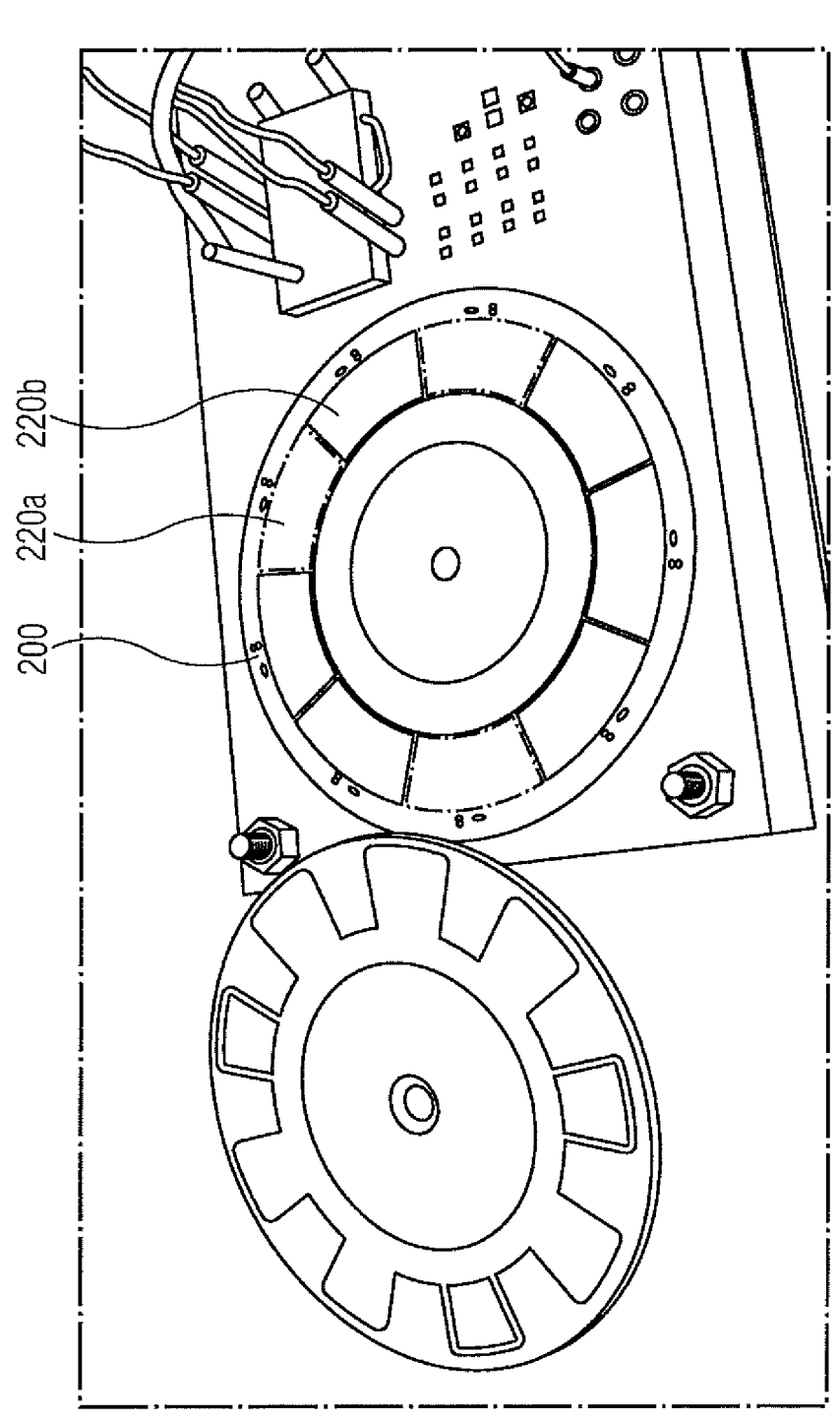
FIG. 3c is a view of a stator according to an example.

More precise details become clear from a consideration in combination with the stator 200 from FIG. 3c. The code 100101000 that is employed is implemented on the stator 200, as well; this code can also be read the other way around (000101001 or 010010001), depending on which side of the rotor 300 faces the top of the stator 200 shown. In other words, the stator 200 has different segments that describe or implement the abovementioned code. On the stator 200 in FIG. 3c, there are, starting at the 9:00 o'clock position, three segments 220a corresponding to the 1 and six segments 220b corresponding to the 0. On the rotor 100, there are likewise three first rotor vanes 120a (sometimes referred to below as hollow vanes 120a) corresponding to the 1 and six second rotor vanes 120b (sometimes referred to below as solid vanes 120b) corresponding to the 0. If it is assumed that FIG. 3c shows a top of the stator 200, then FIGS. 3a and 3d can each show an underside or a view of the underside of the rotor 300. What is important in this context is that the rotor 300 and the stator 200 are matched to one another in such a manner that there is a position in which the first rotor vanes 120a (the entirety of the first rotor vanes 120a) completely overlap the segments 220a (the entirety of the segments 220a).

Located on the stator 200 are the nine segments of the receiver, which incorporate the coding of the rotor 100. The three segments 220a are interconnected to form a first capacitance or a first capacitor, for instance. For example, the three segments 220a are connected in parallel with one another, form a capacitance bank, and thus add together. The six segments 220b are interconnected to form a second capacitance or a second capacitor, for instance. For example, the three segments 220b are connected in parallel with one another, form a capacitance bank, and thus add together. The two capacitance banks thus formed are, e.g., connected in series to form a differential capacitor. For instance, the respective capacitances or capacitors are formed from the interaction of the respective rotor 100, in particular the rotor vanes of the rotor 100, and the stator 200, in particular the segments of the stator 200.

The code "matches" at the index switching point when the three hollow vanes 120a are located exactly over the three detector segments 220a. Then the capacitance there is three times smaller on account of the three hollow vanes 120a, and the capacitance with the six solid vanes 220b over the second capacitor bank is the largest capacitance that arises over the rotation. If the rotor 100 rotates relative to the stator, then the overlap of the rotor vanes 120a, 120b relative to the segments 220a, 220b changes. To be more precise, the overlap decreases. Consequently, the capacitance decreases.

The coding is such that the switch signal still occurs only once over the 360°, at the index point. However, since all nine vanes are now contributing, and not just a single vane, the signal amplitude is increased by a factor of 3. This can be evaluated much better, especially with the weak signals and small capacitances used.

To be more precise, the evaluation unit can, by means a rotor 100 coded with the EX9 coding, always unambiguously recognize that the single/sole first rotor vane of the multiple first rotor vanes 120a or the entirety of the first rotor vanes 120a of the multiple first rotor vanes 120a reaches (has reached) the index position. In this case, the evaluation unit can be designed to detect when the single/sole first rotor vane of the multiple first rotor vanes 120a or the entirety of the first rotor vanes 120a of the multiple first rotor vanes 120a reaches or exceeds the index position. When the single/sole first rotor vane of the multiple first rotor vanes 120a or the entirety of the first rotor vanes 120a of the multiple first rotor vanes 120a reaches or exceeds the index position, the evaluation unit can output a switch signal. For instance, a counter can be increased by the switch signal. As a result, not only can rotation angles of up to 360° be unambiguously identified, but also any rotation angle at all can be unambiguously identified by counting complete rotations. In this way, the indexer (which can also be referred to as an indexing component or indexing device) described with respect to FIG. 2, for example, can be implemented as a capacitive sensor. For instance, the indexing component or indexing device designed as a capacitive sensor can be arranged on the layers L3 and L4 of the printed circuit board from FIG. 2.

In general, the evaluation unit can be designed to determine a rotation angle of the rotor or of the first rotor vanes 120a. The at least one rotor can be designed as two rotors. A first of the two rotors can be arranged on the input shaft (the input side) and a second of the two rotors can be arranged on the output shaft (the output side). The evaluation unit can determine the rotation angle at both rotors and take the difference between the two rotation angles in order to determine a differential angle. From the differential angle, the evaluation unit can determine a torque acting on the torsion bar.

Figure 3D:
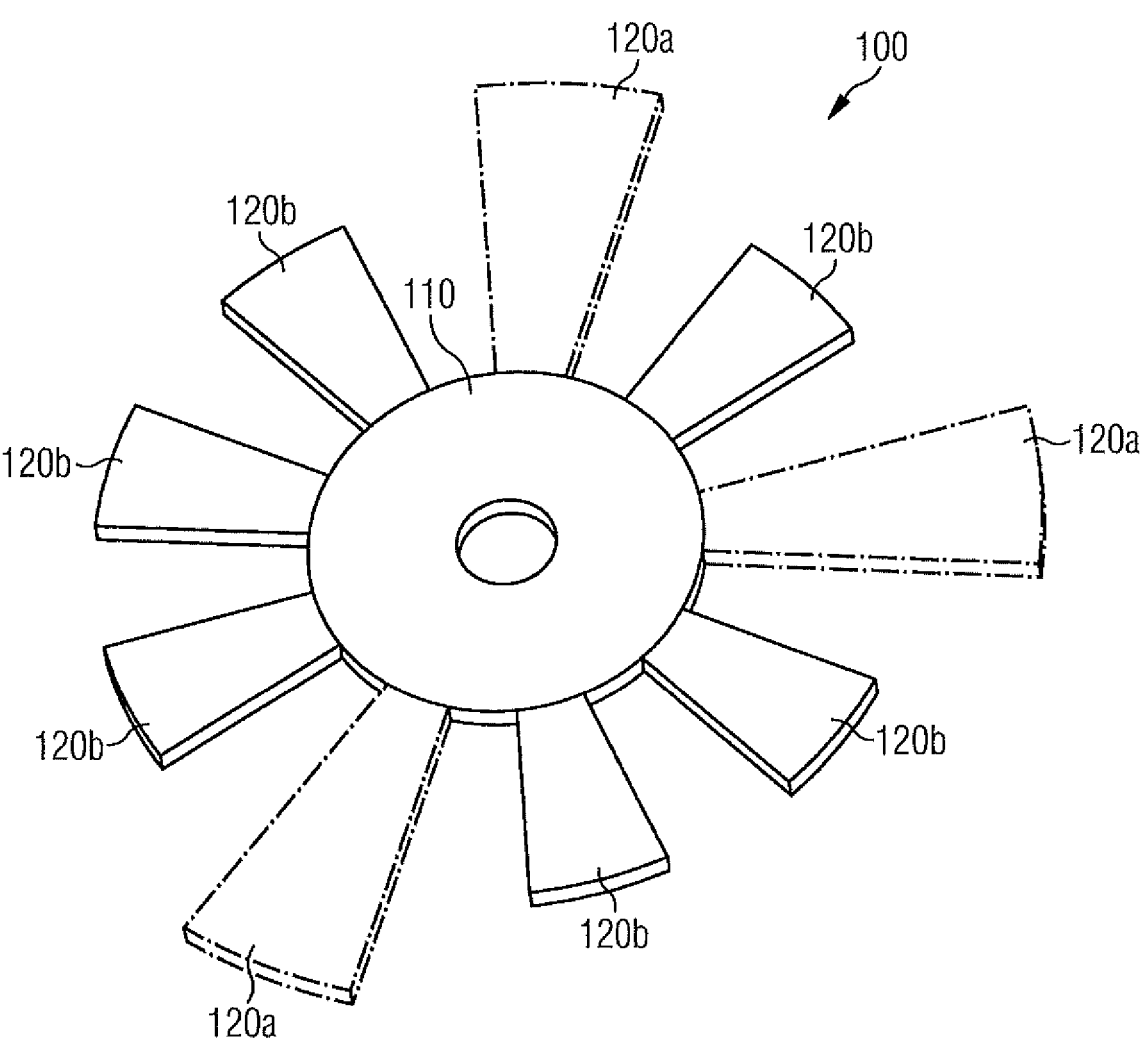
FIG. 3d is a view of a rotor according to an example.

In FIG. 3d, another example can be seen of how the first rotor vanes 120a can be designed to be distinguishable from the second rotor vanes 120b. In this example, the first rotor vanes 120a are designed to be larger than the second rotor vanes 120b. Different designs from those in FIGS. 3a and 3d are possible.

The rotor from FIGS. 3a and 3d has a certain asymmetry. The rotor can alternatively also be constructed symmetrically, however. In this way, it can also be used optimally for inductively operating solutions. This means that even a use with its metallically conductive vanes as an inductive position sensor (CIPOS) is possible.

The evaluation unit can be designed to detect when the three first rotor vanes 120a reach, have reached, or exceed a predetermined rotational position. When the predetermined rotational position is reached or exceeded, the evaluation unit can increase a counter (e.g., by the value 1). For example, the evaluation unit can generate a switch signal every time the multiple first rotor vanes 120a reach, have reached, or exceed the predetermined rotational position. This can be the case once per complete revolution, in particular. The switch signal can indicate raising the switch. The predetermined rotational position can correspond to a rotation angle segment, for example. The rotation angle segment can cover an angle of 20° or 40°, for example. As a result, predetermined rotation angles, such as partial or complete rotations, can be counted/indexed. In this way, the indexer (which can also be referred to as an indexing component or indexing device) described with respect to FIG. 2, for example, can be implemented as a capacitively acting sensor.

The examples described with respect to FIGS. 3a to 3d serve, as it were, to implement a capacitively acting switch. The capacitively acting switch can be combined with the inductively acting rotation angle determination, such as was described with respect to FIG. 1. For instance, the evaluation unit can determine the rotation angle of the rotor (up to a complete rotation of 360°) while taking inductive coupling into consideration. By additionally taking the value of the counter into consideration, the overall rotation of the rotor that has occurred, with values of over 360°, can be efficiently determined. In effect, a capacitively acting switch is combined with an inductive rotation angle determination. In this way, an inductively operating rotation angle determination can be optimally combined with a capacitively acting switch at a predetermined rotational position (for example, at 40° or 360°). This means that a use of the switch with metallically conductive vanes as an inductive position sensor (CIPOS) is possible.

According to one example, the largest unambiguous range is on the side of the nine rotor vanes and is therefore 360°/9=40°. In this case, the index switch recognizes straight-ahead driving even with validation. Accordingly, counting takes place by means of the counter once a predetermined rotational position, for example an angle segment of 40°, is reached or exceeded (in other words, the rollovers of the 40° trace are counted). The steering angle is thus: steering angle=n*40°+measured angle of the rotation angle sensor (e.g., CIPOS) within the 40° segment.

In other words, according to this example, the reaching or exceeding of an angle segment (of, e.g., 40°) is detected. Once the angle segment is reached or exceeded, the counter is increased or decreased as a function of the direction of the exceedance. This counter operates capacitively. If, for example, five angle segments were reached or exceeded, then an approximate rotation angle of 5*40°=200° can be determined on the basis of the counter. On the basis of the inductively operating rotation angle determination device, the exact steering angle can be determined. If, for example, an angle of 12° is determined with the rotation angle determination device, then the result is a steering angle of 5*40°±12°=212°.

In other words, a capacitive modulation for a capacitive sensor or switch that operates, e.g., in parallel to the inductive sensor is achieved by the means that the rotor is designed such that a coding of the rotor vanes is carried out between the rotor and stator of the angle sensor or angle switch. In this way, individual vanes of the rotor that are to be emphasized can be distinguished from other vanes that are not to be coded.

By means of the implementation described, the signal amplitude of the sensor system can be increased through the arrangement of a specific pattern or a specific sequence (coding) of marked and unmarked vanes. At the same time, the switching point can still be guaranteed to occur only one single time over the entire circumference of 360°. The improvement as compared with a version with only a single marked vane can be produced by the means that multiple vanes contribute to an evaluation instead of just a single vane. In this way, the signal amplitude is increased significantly, which makes the functioning of such a sensor more robust and more precise.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A position detection device for a rotation angle sensor, the position detection device comprising:
   at least one stator;

at least one rotor having a main body and multiple rotor vanes extending radially outward from the main body, wherein multiple first rotor vanes of the multiple rotor vanes are designed differently from multiple second rotor vanes of the multiple rotor vanes; and an evaluation unit to detect when the multiple first rotor vanes reach, have reached, or exceed a predetermined rotation angle, wherein the multiple first rotor vanes and the multiple second rotor vanes are arranged in a predetermined sequence relative to one another, such that, at least one second rotor vane is provided between each two consecutive first rotor vanes in a circumferential direction around an entirety of the main body, and a number of the second rotor vanes between each two consecutive first rotor vanes in the circumferential direction around the entirety of the main body is different.

2. The position detection device according to claim 1, wherein the evaluation unit is designed to detect when the entirety of the multiple first rotor vanes reaches, has reached, or exceeds a predetermined rotation angle.

3. The position detection device according to claim 1, wherein the multiple first rotor vanes have a different shape and/or a different surface than the multiple second rotor vanes.

4. The position detection device according to claim 1, wherein the multiple first rotor vanes are hollow vanes and the multiple second rotor vanes are solid vanes, or wherein the multiple first rotor vanes are solid vanes and the multiple second rotor vanes are hollow vanes.

5. The position detection device according to claim 1, wherein the multiple first rotor vanes are longer than the multiple second rotor vanes, or wherein the multiple first rotor vanes are shorter than the multiple second rotor vanes.

6. The position detection device according to claim 1, wherein the number of the multiple rotor vanes is nine, the number of the multiple first rotor vanes is three, and the number of the multiple second rotor vanes is six, and wherein the predetermined sequence of the multiple first rotor vanes and of the multiple second rotor vanes relative to one another is as follows: second rotor vane, first rotor vane, second rotor vane, second rotor vane, first rotor vane, second rotor vane, second rotor vane, second rotor vane, first rotor vane, or shifts of the predetermined sequence.

7. The position detection device according to claim 1, wherein the evaluation unit generates a switch signal when the multiple first rotor vanes reach, have reached, or exceed the predetermined rotation angle.

8. The position detection device according to claim 7, wherein the multiple first rotor vanes and the multiple second rotor vanes are arranged relative to one another such that the evaluation unit recognizes that the switch signal is generated only once per complete rotation of the rotor.

9. The position detection device according to claim 1, wherein the multiple first rotor vanes are interconnected to form a first capacitor, and the multiple second rotor vanes are interconnected to form a second capacitor.

10. A rotation angle sensor comprising:
the position detection device according to claim 1; and
a rotation angle determination device comprising the at least one stator, the at least one rotor, and the evaluation unit, wherein the evaluation unit determines a rotation angle of the at least one rotor relative to the at least one stator, starting from a reference position.

11. The rotation angle sensor according to claim 10, wherein the evaluation unit determines the rotation angle of the at least one rotor based on an inductive coupling between the at least one rotor and the at least one stator.

12. A system having a rotation angle sensor according to claim 10 and a rotating element, wherein the at least one stator of the rotation angle sensor is arranged to be stationary relative to the rotating element, and the at least one rotor is connected to the rotating element in a rotationally fixed manner, wherein the evaluation unit of the rotation angle sensor determines, from the determined rotation angle of the at least one rotor, a torque affecting the rotating element.

13. The position detection device according to claim 1, wherein each of the multiple first rotor vanes has a same design as one another, and wherein each of the multiple second rotor vanes has a same design as one another.

* * * * *